O. ZERK.
PROCESS OF MAKING AND MOUNTING THUMB SCREWS.
APPLICATION FILED NOV. 18, 1912.

1,202,764.  Patented Oct. 24, 1916.

Witnesses:
R. L. Bruck.
Justin W. Macklin

Inventor
Oscar Zerk
By Albert H. Bates,
Atty.

UNITED STATES PATENT OFFICE.

OSCAR ZERK, OF CLEVELAND, OHIO, ASSIGNOR, BY MESNE ASSIGNMENTS, TO GEORGE W. BOWEN, OF AUBURN, NEW YORK.

PROCESS OF MAKING AND MOUNTING THUMB-SCREWS.

1,202,764.   Specification of Letters Patent.   Patented Oct. 24, 1916.

Application filed November 18, 1912. Serial No. 731,942.

*To all whom it may concern:*

Be it known that I, OSCAR ZERK, a subject of the Emperor of Austria, residing at Cleveland, in the county of Cuyahoga and State of Ohio, have invented a certain new and useful Improvement in Processes of Making and Mounting Thumb-Screws, of which the following is a full, clear, and exact description, reference being had to the accompanying drawings.

My invention relates to a screw particularly applicable for operating the follower, or plunger, of a grease cup, and the object of the invention is to provide a simple and highly efficient device of this character.

One embodiment of the invention is illustrated in the accompanying drawings wherein:—

Figure 1:
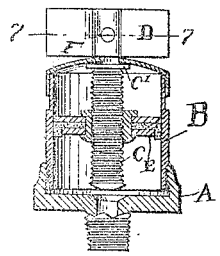
Figure 2:
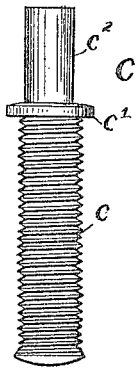
Figure 3:
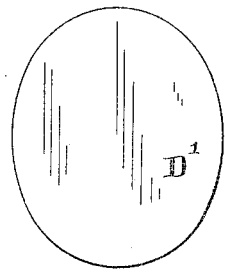
Figure 4:
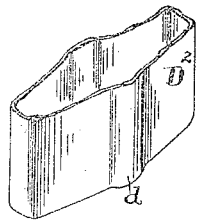
Figure 5:
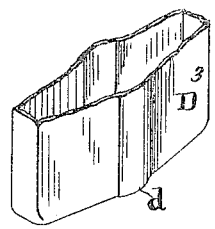
Figure 6:
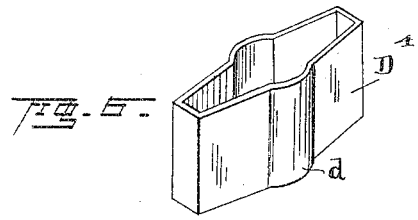
Figure 7:
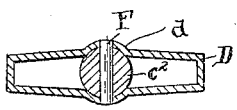

Figure 1 is a vertical sectional view of a grease cup embodying the invention. Fig. 2 is an enlarged elevation of the stem of the screw. Fig. 3 is a plan view of the blank from which the head, or handle, is formed. Fig. 4 is a perspective view of the head, or handle, in incompleted form. Fig. 5 is a similar view after the corners of the handle have been squared. Fig. 6 is a similar view of the completed head, or handle; and Fig. 7 is a transverse sectional view for illustrating the connection between the head and the stem.

The base of the grease cup is designated A in Fig. 1, the body thereof, B, the follower or plunger E, the stem of the operating screw therefor, C, and the head of the screw D. The cap of the cup is retained between the lower edge of the head D and a shoulder $c'$ formed on the stem C. The screw comprises a stem and a separately formed head connected thereto by a pin F, or equivalent means.

As illustrated, the stem is provided with a threaded portion $c$, a plain shank $c^2$ and the peripheral shoulder $c'$, before referred to.

The head or handle is formed from a flat blank of sheet metal D'. This blank is first pressed into the form of a trough having rounded corners substantially as is shown in Fig. 4, and thereafter the corners are squared, as shown in Fig. 5, and finally the top of the head, or bottom of the trough, is squared, and the edge of the head is trimmed, as shown in Fig. 6.

The completed head, or handle, is substantially of trough-shape and includes flat parallel ends, and spaced apart sides having arcuate portions $d$ centrally thereof. The sides preferably taper from the arcuate portions toward the flat ends. The head further includes a bottom or top, as the case may be, which is a portion integral with the sides and ends and constituting the bottom of the trough, the lower side of the head being open.

The cap of the grease cup is provided with an axial opening through which the shank $c^2$ is inserted, and thereafter the head or handle is placed on the shank $c^2$ and secured in position by the pin F. The head is centered on the stem in being applied thereto by the arcute parts $d$ which embrace opposite sides of the shank.

As will be noted, the wall of the grease cup cap is confined between the shoulder $c'$ and the edge of the head or handle and the parts thereby securely held from detachment, while the screw is free to rotate in the cap for the purpose of shifting the follower or plunger E.

What I claim is:—

1. A screw comprising a stem and a sheet metal head consisting of a unit mounted on the stem and including a body having side and end walls and a top and an open lower side, the upper end of the stem being inserted through the open side of the head and the sides of the head being engaged with the stem and secured thereto, substantially as and for the purpose set forth.

2. A screw comprising a stem and a sheet metal head consisting of a unit mounted on the stem and including a body having side and end walls and a top and an open lower side, the upper end of the stem being inserted through the open side of the head and the sides of the head being formed with channels embracing opposite sides of the stem, substantially as and for the purpose specified.

3. A screw comprising a stem and a sheet metal head or handle of trough-shape having flat ends and sides provided with arcuate portions, said sides tapering from such portions toward the ends, and one end portion of the stem being inserted between said arcuate portions, and means for rigidly connecting the head to the stem, substantially as and for the purpose set forth.

In testimony whereof, I hereunto affix my signature in the presence of two witnesses.

OSCAR ZERK.

Witnesses:
ALBERT H. BATES,
JUSTIN W. MACKLIN.

Copies of this patent may be obtained for five cents each, by addressing the "Commissioner of Patents, Washington, D. C."